United States Patent [19]

Greenslade

[11] Patent Number: 4,974,327
[45] Date of Patent: Dec. 4, 1990

[54] ADJUSTABLE THREE-POINT THREAD MEASURING DEVICE

[76] Inventor: Joe E. Greenslade, P.O. Box 330865, Fort Worth, Tex. 76163

[21] Appl. No.: 462,655

[22] Filed: Jan. 9, 1990

[51] Int. Cl.⁵ .............................................. G01B 3/40
[52] U.S. Cl. .................. 33/199 R; 33/199 B; 33/783
[58] Field of Search ............. 33/199 R, 199 B, 555.1, 33/555.3, 783, 797, 807, 808, 501.7, 501.14, 501.17

[56] References Cited

U.S. PATENT DOCUMENTS

| | | |
|---|---|---|
| 427,455 | 10/1889 | Greenslade . |
| 1,423,339 | 7/1922 | Ledell .................. 33/199 R |
| 1,464,938 | 8/1923 | Jordan .................. 33/199 R |
| 2,566,356 | 9/1951 | Niper .................... 33/199 R |
| 2,730,808 | 1/1956 | Johnson ................ 33/199 R |
| 2,842,862 | 7/1958 | Johnson ................ 33/199 R |
| 3,052,035 | 9/1962 | Shuster ................. 33/199 R |
| 3,277,578 | 10/1966 | Johnson et al. ....... 33/199 R |
| 3,879,854 | 4/1975 | Johnson ................ 33/199 R |
| 4,202,109 | 5/1980 | Schasteen ............. 33/199 R |

OTHER PUBLICATIONS

Mercury Gage Company Instruction Manual.
L. S. Starrett Company, 121 Crescent St., Athol, MS, 01331.

Primary Examiner—Allan N. Shoap
Assistant Examiner—Patrick R. Scanlon
Attorney, Agent, or Firm—James E. Bradley

[57] ABSTRACT

A thread gaging device has three thread gage rollers mounted 120 degrees apart from each other. Two horizontal arms extend outward from the base. One of the rollers mounts to one arm and the other two rollers mount to the other arm. The two rollers on the one arm can slide horizontally relative to each other to select the positions. Also, the two rollers can be repositioned vertically relative to the other roller to a selected position. The front of the rollers is pivotal relative to the base. An indicator will measure the amount of pivotal movement to gage a threaded fastener inserted between the rollers.

16 Claims, 3 Drawing Sheets

ADJUSTABLE THREE-POINT THREAD MEASURING DEVICE

BACKGROUND OF THE INVENTION

1. Field of the Invention

This invention relates in general to thread gaging devices, and in particular to a device that uses three gage rollers spaced 120 degrees apart from each other and adjustable to various thread diameters.

2. Description of the Prior Art

Threads on screws and bolts are often gaged for quality assurance. One type of thread gaging device utilizes three gage rollers. Each roller has threads which have been formed to specification. The rollers are rotatably mounted on a device 120 degrees apart from each other. One of the rollers can be pivoted back to allow a threaded member to be inserted. Then a measuring device will measure the deflection of the pivotal member to determine whether or not the threads have been accurately formed.

While this is workable for threads of a particular diameter and pitch, if the device is to be used for measuring the diameters of more than one pitch, adjustments must be made. In the prior devices, typically the rollers will slide on slides which extend outward on radial lines from a center line located equidistant between the three gage rollers. A template can be placed over the rollers to determine the desired position relative to each other. Then the rollers will be fixed to the slides at that position.

A disadvantage of this type of device is that it is very difficult to precisely position rollers at the correct position, even with a template. Because all three of the rollers will slide on radial lines, it is possible for the template to fit over the gage rollers in more than one position relative to the base of the thread gage. The gage rollers could be slightly cocked with the center line of the template off from the true center line of the device. This would affect the measurement.

SUMMARY OF THE INVENTION

The measuring device of this invention has a base and a pair of arms extending outward from the base. Two thread gage members or rollers are mounted to one of the arms and one thread gage member or roller is mounted to the other arm. Means are provided for selectively positioning the second and third gage rollers relative to each other along a straight line on the second arm. The straight line is preferably a horizontal line. Also, the first gage roller is positionable relative to the second and third gage rollers along a straight line. This latter straight line is preferably vertical.

One of the arms is pivotally mounted to the base. An indicator will monitor the relative movement of that arm. Because the gage rollers can move in only directions perpendicular to each other, rather than the radial line as in the prior art, the template will fit over the gage rollers only if the center line of the template coincides with desired center line.

In a second embodiment, the gage members comprise pairs of circular blades. Each pair mounts to a shaft that aligns with the longitudinal axis of the screw. The blades on each shaft can slide relative to each other. This allows the blades to be positioned to locate in thread roots for measuring the minor diameter of the screw.

DETAILED DESCRIPTION OF THE INVENTION

Figures 1, 5:
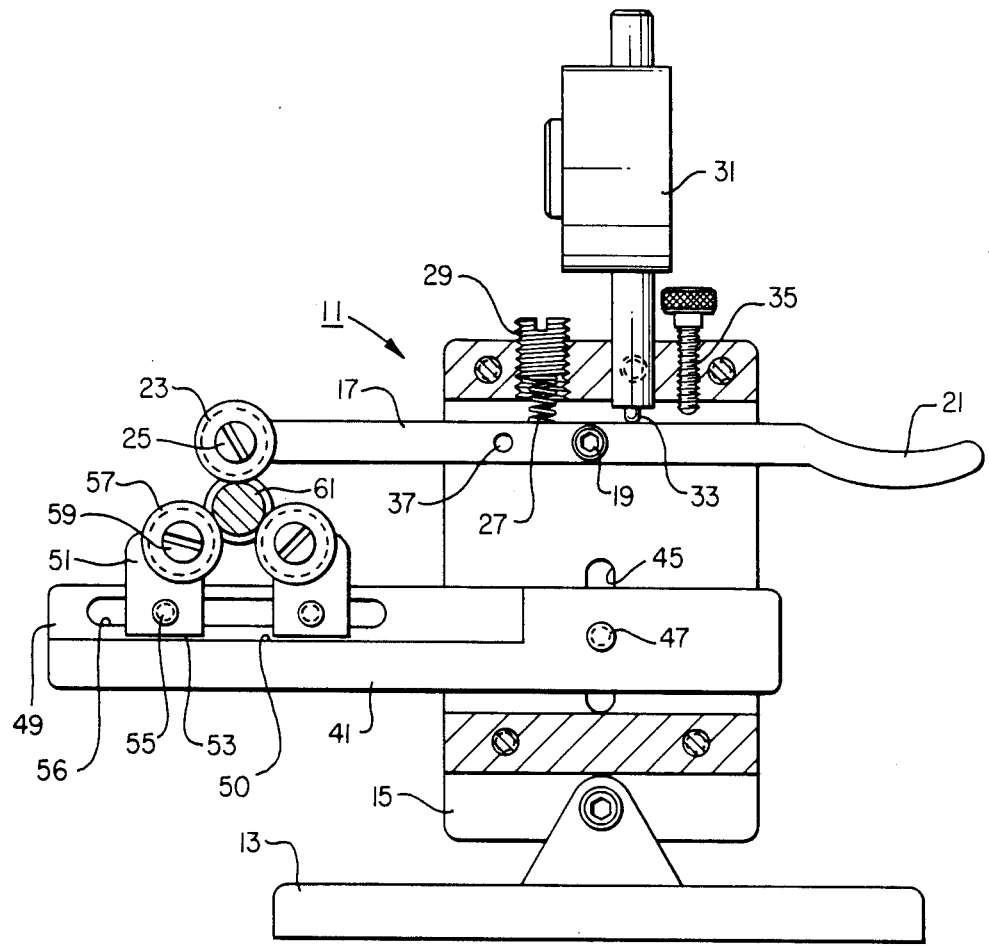
FIG. 1 is a rear elevational view, partially sectioned, of a thread gage constructed in accordance with this invention.
FIG. 5 is an exploded sectional view of a gage roller located on the pivotal arm of the thread gage of FIG. 1.

Referring to FIG. 1, a thread gage 11 has a base 13 for sitting on a counter. Base 13 has an upright portion 15. A pivotal arm 17 mounts to the upright portion 15. Pivotal arm 17 mounts to the upright portion 15 by means of a fulcrum or pivot pin 19. Pivotal arm 17 has a lever 21 on one end, with the pivot pin 19 being located about the middle of the pivotal arm 17.

A thread gage member or roller 23 rotatably mounts to the end of the pivotal arm 17 opposite the lever 21. Gage roller 23 is rotatable and secures to the arm 17 by means of a conventional mounting assembly illustrated in FIG. 5. The mounting assembly includes an axis pin 24. The gage roller 23 slides onto the axis pin 24 and is secured by a screw 25, which allows the gage roller 23 to rotate on the axis pin 24. The axis pin 24 is mounted to the pivotal arm 17 by a screw 26. Gage roller 23 has precisely machined threads in its circumference for a selected pitch.

A spring 27 acts as a bias means to urge the end of the pivotal arm 17 containing the gage roller 23 downward. Spring 27 is a coil spring held in place by threaded plug 29. Plug 29 screws into a threaded hole in the top of the upright portion 15 of base 13. Spring 27 locates to one side of the pivot pin 19.

A conventional indicating instrument 31 mounts to the top of the upright portion 15 of base 13. Indicator 31 has a probe 33 that will move axially, which in this case is vertical. Indicator 31 will provide a measurement of the degree that the pivotal arm 17 pivots. The probe 33 engages an upper side of the pivotal arm 17 and is located on the lever end 21 side of the pivot pin 19.

A stop member 35 screws into a hole in the top of the upright portion 15. The stop member 35 is a screw that can be rotated to a desired extension for contact by the pivotal arm 17. Stop member 35 locates on the side of the pivotal arm 17 that contains the lever end 21. Stop member 35 serves as a stop to limit the extent of downward movement of the gage roller 23.

A hole 37 extends transversely through the arm 17 on the left side of the pin 19, as shown in FIG. 1. A locking pin 39 (FIG. 2) will insert through a hole 40 in the upright portion 15 of base 13 and into the hole 37. This releasably locks the pivotal arm 17 in a zero or fixed position relative to the base 13. In the fixed position, the pivotal arm will be horizontal and perpendicular to the longitudinal axis of the base upright portion 15.

Figure 2:
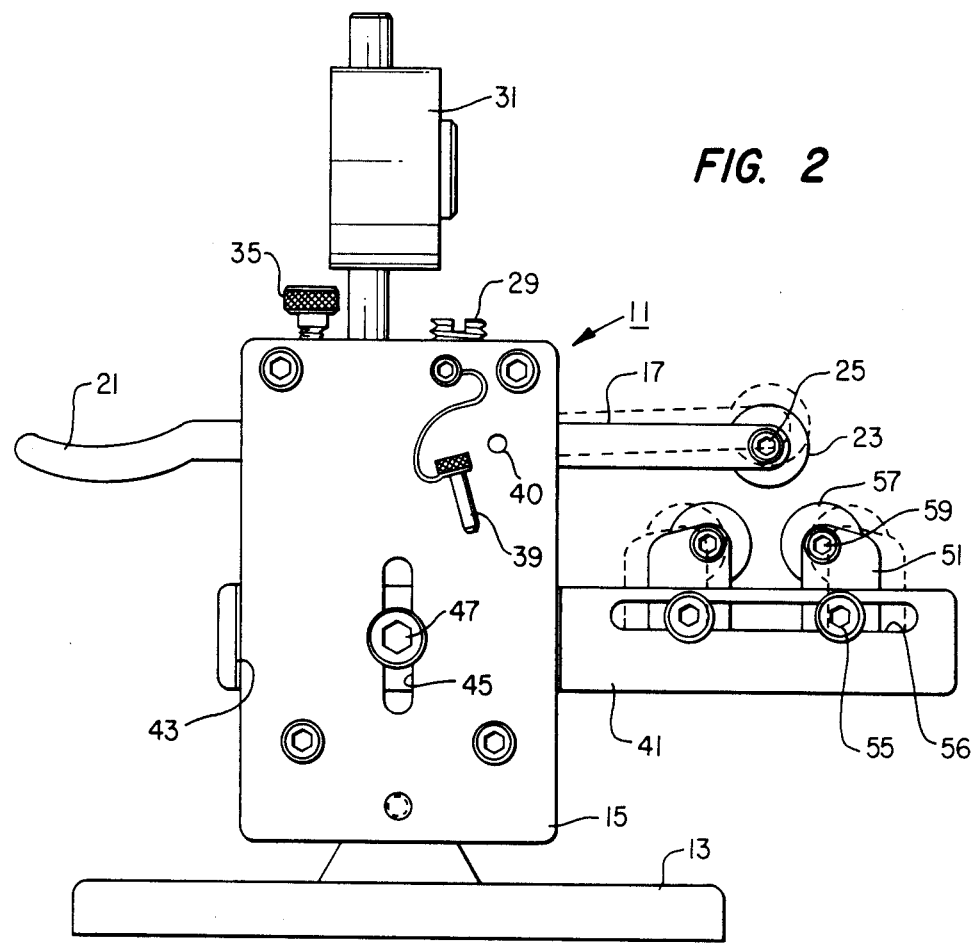
FIG. 2 is a front view of the thread gage in FIG. 1.

A sliding arm 41 also mounts to the base upright portion 15. Sliding arm 41 is substantially parallel to the pivotal arm 17 when the pivotal arm 17 is in the fixed position. Sliding arm 41 secures to the base upright portion 15 by means of a bolt 47. Bolt 47 extends through an elongated vertical hole 45 in the base upright portion 15. Bolt 47 can be loosened to allow the bolt 47 and the arm 41 to slide vertically relative to the base upright portion 15 and the pivotal arm 17. As shown in FIG. 2, the sliding arm 41 has a recess 43 on its rearward side that fits closely on opposite sides of the base upright portion 15. This recess 43 allows vertical sliding movement of the sliding arm 41, but prevents any pivotal movement of the sliding arm 41.

A recess or guide section 49 extends horizontally along the upper side of the sliding arm 41. The guide section 49 has an upward facing shoulder 50. A pair of brackets 51 slidably mount to the guide section 49. Each bracket 51 has a lower edge 53 that will be closely spaced above the guide section shoulder 50. This keeps the brackets 51 in an upright position as they slide along the guide section 49.

The means for mounting each bracket 51 to the sliding arm 41 comprises a bolt 55 that screws into a hole provided in each bracket 51. The bolt 55 has an enlarged head on its opposite side, as shown in FIG. 2. The bolt 55 passes through a horizontally elongated hole 56 that extends along the guide section 49. The head of the bolt 55 will not pass through the hole 56. The brackets 51 can be selectively positioned by loosening the bolts 55, sliding the brackets 51 into a desired position, then tightening the bolts 55.

A gage roller 57 mounts to each bracket 51. Each gage roller 57 is similar to the gage roller 23. Each gage roller 57 has a circumference containing carefully machined threads. A screw 59 secures the gage rollers 57 to an axis pin (not shown) which is mounted to the brackets 51 in the same manner as shown in FIG. 5. The gage rollers 57 are rotatable relative to the brackets 51.

Figure 3:
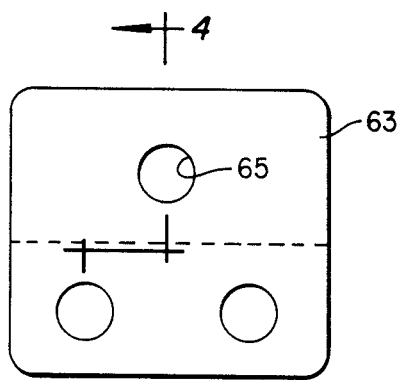
FIG. 3 is a front view of a template for use with the thread gage of FIG. 1.
Figure 4:
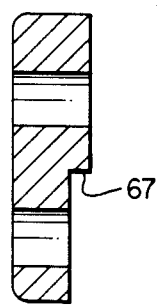
FIG. 4 is a sectional view of the template of FIG. 3, shown along the line 4—4 of FIG. 3.

The gage rollers 23 and 57 can be positioned to receive a threaded member 61 between them. The threaded member 61 should have the same pitch as the pitch of the threads contained on the gage rollers 57. A template 63, shown in FIG. 3, will slide over each of the axis pins 24 of gage rollers 23 and 57 to properly position them for measuring the diameter of the threaded member 61. The template 63 has three holes 65 spaced 120 degrees apart from a common center line. The holes 65 will insert over the axis pins 24 of the gage rollers 23 and 57 to properly position them 120 degrees apart from each other. As shown in FIG. 4, template 63 is thicker in its upper portion than its lower portion, resulting in a downward facing shoulder 67 on its rearward side.

In operation, to position the gage rollers 23, 57 at the proper position, the rollers 23, 57 will be removed from the axis pins 24. During this procedure, the locking pin 39 will retain the pivotal arm 17 in a stationary position. Bolts 47, 55 will be loosened. Template 63 will be placed on the axis pins 24 of the gage rollers 57 to position them at the proper distance from each other. The sliding arm 41 will be moved upward and the template 63 will be placed on the axis pin 24 of the gage roller 23. The shoulder 67 (FIG. 4) enables the template 63 to slide onto the axis pin 24 of gage roller 23 first, then onto the axis pins 24 of the gage rollers 57. When the template 63 is on all three axis pins 24, the axis pins 24 will be properly positioned 120 degrees apart and with the center line at the proper point. The pivotal arm 17 will be parallel to the sliding arm 41 in this zero position. The bolts 47, 55 will be tightened. Template 63 may then be removed.

The gage rollers 23, 57 will be placed on the axis pins 24 and secured by screws 25, 59, respectively. The locking pin 39 can then be removed. A ground plug (not shown) for calibration will then be placed between the three gage rollers 23, 57. The indicator 31 will be set to the known diameter of the ground plug. The ground plug will be removed. Stop 35 prevents the rollers 23, 57 from touching each other.

The threaded member 61 will be gaged by pressing downward on lever 21 to provide a clearance for the threaded member 61. Threaded member 61 will be placed on the two gage rollers 57. The lever arm 21 will be released at that point, allowing the gage roller 23 to come in contact with the threaded member 61. The center line of the threaded member 61 will coincide with the center line of the three gage rollers 23 and 57. Spring 27 will urge the gage roller 23 downward against the threaded member 61. The indicator 31 will indicate the diameter of the threaded member 61. If desired, the threaded member 61 may be rotated along with the gage rollers 23, 57 and several measurements taken at different points.

After gaging, the threaded member 61 will be removed by pressing the lever 21. A new threaded member 61 will be placed between the gage rollers 23 and 57 and gaged. If one wishes to gage a threaded member 61 with a different diameter, then a different template 63 will be used. The brackets 51 will be repositioned along the guide section 49 and tightened in place. The sliding arm 41 will be repositioned vertically on the base upper portion 15 and tightened in place. The indicator 31 will be calibrated with a different ground plug.

Figure 6:
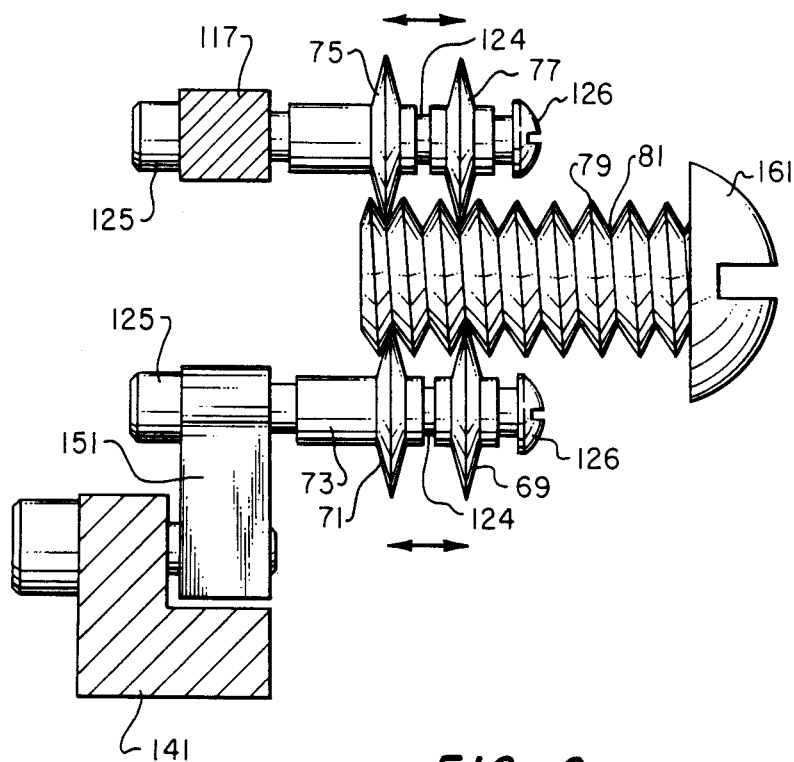
FIG. 6 is a side view, partially sectioned, of an alternate embodiment for the gage members.

In the embodiment of FIG. 6, each the lower gage rollers 57 (FIG. 1) is replaced by a pair of circular disks or blades 69, 71. The upper gage roller 23 (FIGS. 1) is replaced by a pair of circular blades 75, 77. Consequently, there will be six blades, two upper blades 75, 77 and four lower blades 69, 71.

Each of the blades 69, 71, 75, 77 is integrally mounted to a collar 73 for sliding movement on a shaft or an axle pin 124. The blades 69, 71, 75, 77 can slide along the longitudinal axis of each axle pin 124. Also, each blade 69, 71, 75, 77 can rotate on its axle pin 124.

As in the first embodiment, the axle pins 124 are retained by screws 125, 126. The axle pins 124 on the sliding arm 141 mount to brackets 151. Brackets 151 will adjust along the sliding arm 141 in the same manner as brackets 51 of the first embodiment. The axle pin 124 on the pivotal arm 117 also secures by screws 125, 126.

The blades 69, 71, 75, 77 can slide parallel to the axis of a threaded member 161 so as to position within a thread root 81 of a threaded member 161. A thread root 79 separates each thread crest 81. This allows the minor diameter of the threaded member 161 to be measured. The blades 69, 71, 75, 77 serve as locator means for engaging the thread roots 81. Otherwise, the second embodiment operates in the same manner as the first embodiment.

The invention has significant advantages. Allowing the gage rollers to move only vertically and horizontally avoids getting the center line off position when placing the template on the gage rollers. This makes it accurate and easy to reposition the gage rollers for different diameters of threaded fasteners. The sliding pairs of blades allow accurate measurement of the minor diameters of threaded members.

While the invention has been shown in only two of its forms, it should be apparent to those skilled in the art that it is not so limited, but is susceptible to various changes without departing from the scope of the invention.

I claim:

1. An apparatus for measuring threaded members, comprising in combination:

a base;

a first arm mounted to the base and extending outward therefrom;

a second arm mounted to the base and extending outward therefrom;

first, second, and third gage members, the first gage member being mounted to the first arm, and the second and third gage members being mounted to the second arm;

means for selectively positioning the second and third gage members relative to each other along a single second straight line on the second arm;

means for positioning the second and third gage members relative to the first gage member along a first straight line for receiving a cylindrical member to be measured, said second straight line being transverse to said first straight line;

means for mounting one of the arms to the base for movement relative to the base and to the other of the arms to measure a cylindrical member once the first and second gage members are properly positioned; and indicating means for measuring the position of the arm which is movable relative to the base as the cylindrical member is placed in engagement with the gage members.

2. The apparatus according to claim 1 wherein the arm which is movable has a zero position relative to the base, and wherein said first and second straight lines are substantially perpendicular to each other when the arm which is movable is in the zero position.

3. The apparatus according to claim 1 further comprising spring means for urging the arm which is movable toward the other arm.

4. An apparatus for measuring cylindrical members, comprising in combination:

a base;

a first arm mounted to the base and extending horizontally therefrom;

a second arm mounted to the base and extending outward therefrom generally parallel to the first arm;

first, second, and third gage members, the first gage member being mounted to the first arm and the second and third gage members being mounted to the second arm;

horizontal guide means for positioning the second and third gage members relative to each other along a single horizontal line on the second arm;

vertical guide means for selectively varying the vertical distance between the first gage member and the single horizontal line to place the first, second and third gage members in selected positions 120 degrees apart from each other for engaging one of the cylindrical members to be measured;

means for mounting one of the arms to the base for pivotal movement relative to the base;

indicating means for measuring the position of the arm which is pivotal relative to the base as the cylindrical member is placed in engagement with the gage members; and spring means for urging the arm which is pivotal toward the other arm.

5. The apparatus according to claim 4 wherein the horizontal guide means comprises a pair of mounting brackets, each slidably mounted to the second arm for movement independent of each other along the second line, with one of the second and third gage members mounted to each of the mounting brackets; and tightening means mounted to each bracket for selectively tightening the brackets to the second arm.

6. An apparatus for measuring cylindrical members, comprising in combination:

a base having an upright portion;

a first arm mounted to the upright portion of the base and extending horizontally therefrom;

a second arm mounted to the upright portion of the base and extending horizontally therefrom generally parallel to the first arm;

first, second, and third gage rollers;

mounting means for mounting the first gage roller to the first arm;

a pair of brackets, with each of the second and third gage rollers being mounted to one of the brackets;

horizontal guide means for sliding the brackets horizontally along the second arm independently of each other and for tightening the brackets to the second arm in selected positions;

vertical guide means for selectively moving one of the arms vertically relative to the other arm to place the first, second and third gage rollers in selected positions 120 degrees apart from each other for engaging one of the cylindrical members to be measured;

means for mounting one of the arms to the base for pivotal movement relative to the base;

indicating means for measuring the position of the arm which is pivotal relative to the base as the cylindrical member is placed in engagement with the gage rollers; and spring means for urging the arm which is pivotal toward the other arm.

7. The apparatus according to claim 6 wherein the vertical guide means comprises a vertical recess formed in one of the arms for sliding on the upright portion of the base and securing means for securing said arm in a selected position.

8. The apparatus according to claim 6 wherein the first arm is the arm which is pivotally mounted to the upright portion of the base.

9. The apparatus according to claim 6 wherein the first arm is the arm which is pivotally mounted to the upright portion of the base and wherein the vertical guide means comprises:

a vertical recess formed in the second arm for sliding on the upright portion of the base; and securing means for securing the second arm in a selected position.

10. An apparatus for measuring threaded members of a type having a longitudinal axis and thread crests separated by thread roots, comprising in combination:

a base;

a first arm mounted to the base and extending outward therefrom;

a second arm mounted to the base and extending outward therefrom:

a first locator means mounted to the first arm for engaging a thread root at a first location along the longitudinal axis of the threaded member;

second and third locator means mounted to the second arm for holding a threaded member between the first, second and third locator means, each of the second and third locator means having a pair of blades which engage thread roots at spaced locations along the longitudinal axis of the threaded member;

second locator mounting means for mounting the blades of the second locator means on the second arm for independent movement relative to each other along an axis generally parallel to the longitudinal axis of the threaded member;

third locator mounting means for mounting the blades of the third locator means on the second arm for independent movement relative to each other along an axis generally parallel to the longitudinal axis of the threaded member;

means for securing the second and third locator mounting means on the second arm at selected positions relative to each other along a single second straight line on the second arm;

means for securing the second and third locator means relative to the first locator means along a first straight line for receiving the threaded member between the first, second and third locator means, said second straight line being transverse to said first straight line;

means for mounting one of the arms to the base for movement relative to the base and to the other of the arms to measure the threaded member; and indicating means for measuring the position of the arm which is movable relative to the base as the threaded member is placed in engagement with the first, second, and third locator means.

11. The apparatus according to claim 10 wherein the first locator means comprises a pair of blades which engage thread roots at spaced locations along the longitudinal axis of the threaded member.

12. The apparatus according to claim 10 wherein the second locator mounting means and the third locator mounting means each comprises a shaft carried by the second arm generally parallel to the longitudinal axis of the threaded member, the blades being freely slidable along the shaft.

13. The apparatus according to claim 10 wherein each of the blades is circular.

14. An apparatus for measuring threaded members of a type having a longitudinal axis and thread crests separated by thread roots, comprising in combination:

a base having an upright portion;

a first arm mounted to the upright portion of the base and extending horizontally therefrom;

a second arm mounted to the upright portion of the base and extending horizontally therefrom generally parallel to the first arm;

a first blade means mounted to the first arm for engaging a thread root of the threaded member;

a pair of brackets;

horizontal guide means for sliding the brackets horizontally along the second arm independently of each other and for tightening the brackets to the second arm in selected positions;

a shaft extending from each of the brackets parallel to the longitudinal axis of the threaded member;

second and third pairs of blades, each of the blades of each pair being mounted to one of the shafts for sliding movement relative to each other along the shafts for engaging thread roots of the threaded member at spaced locations along the longitudinal axis of the threaded member;

vertical guide means for selectively moving one of the arms vertically relative to the other arm to place the first blade and second and third pairs of blades in selected positions 120 degrees apart from each other for engaging one of the threaded members to be measured;

means for mounting one of the arms to the base for pivotal movement relative to the base;

indicating means for measuring the position of the arm which is pivotal relative to the base as the threaded member is placed in engagement with the blades; and spring means for urging the arm which is pivotal toward the other arm.

15. The apparatus according to claim 14 wherein a shaft is mounted to the first arm and wherein said first blade means comprises two blades mounted to the shaft on the first arm.

16. The apparatus according to claim 15 wherein each of the blades is circular and rotatably mounts on one of the shafts.

* * * * *